Patented Apr. 9, 1935

1,997,106

UNITED STATES PATENT OFFICE 1,997,106

COATING COMPOSITION

Ralph T. K. Cornwell, Fredericksburg, Va., assignor to Sylvania Industrial Corporation, Fredericksburg, Va., a corporation of Virginia No Drawing. Application November 2, 1932, Serial No. 640,899

16 Claims. (Cl. 134—79)

This invention relates to moistureproof compositions and has as a general object the provision of novel compositions of matter adapted to be used with a solvent in the formation of transparent, non-greasy, non-tacky and moistureproof coatings, sheets, films, etc.

Another object of the invention is to provide a lacquer or coating composition comprising a lacquer base, a wax and a non-resinous agent which will increase the quantity of wax compatible in compositions of the type hereinafter referred to.

A specific object of the invention is to incorporate a blown oily material with a coating composition comprising a lacquer base and a wax whereby novel and important properties are imparted to the composition and to films or coatings formed therefrom.

It is a further specific object of the invention to provide a novel wax-containing composition for the production of sheets, films or coatings which, in addition to being transparent, moistureproof, non-tacky and non-greasy, shall be heat-sealable to such a degree as to enable contiguous surfaces coated therewith to be autogenously heat-sealed at relatively low temperatures.

Other objects of the invention will in part be obvious and will in part appear hereinafter.

The invention accordingly comprises novel products possessing the characteristics, properties and the relation of constituents, all as exemplified in the following detailed disclosure and the scope of the application of which will be indicated in the claims.

As shown in my copending application Serial No. 517,298, filed February 20, 1931, nitrocellulose is compatible with only limited quantities of wax, and in general the addition of plasticizers decreases still further the amount of wax which can be incorporated in nitrocellulose and yet give rise to clear films. Heretofore, in order to incorporate more than about 2% of wax in a transparent cellulosic coating, such for example as one containing nitrocellulose, a plasticizer and wax, it has been deemed essential to employ a gum or resin to render the wax compatible with the lacquer base. For instance, in the Charch and Prindle United States Patent 1,737,187, there is disclosed a coating composition for moistureproofing regenerated cellulose sheets comprising from 30 to 70 parts of nitrocellulose, 30 to 60 parts of gum, 2 to 6 parts of wax and 5 to 30 parts of plasticizer. The disadvantages of varying from these ingredients and proportions, and in particular the necessity for the use of the gum, is pointed out at length in this patent.

As shown in my copending application Serial No. 517,298, an excellent moistureproofing composition may be obtained using less than 2% of wax and eliminating entirely the gum or resin. While the composition of the copending case is useful for a wide variety of purposes, it is desirable for certain applications to have a composition possessing a still higher moistureproofness with maintained heat-sealability, and this is accomplished effectively and efficiently by the present invention by the use of blown oil.

In carrying out the invention, I employ a composition comprising generally a compatible mixture of lacquer base, a wax and a blown oil, and a plasticizer in cases where added flexibility is desired. I have found that the use of a relatively small amount of blown oil enables me to incorporate in the composition sufficient wax to give rise to a highly moistureproof, transparent, non-tacky and non-greasy and substantially odorless film or coating, which, with a suitable plasticizer, is readily heat-sealable.

By way of illustration but not by way of limitation, there are given in the following table the several ingredients of a novel coating composition, formulated in accordance with the present invention, (exclusive of solvents):

| | |
|---|---|
| Lacquer base | 50%–75% |
| Plasticizer | 25%–45% |
| Wax | 0.5%– 5% |
| Blown oil | 0.5%– 5% |

The lacquer base comprises preferably nitrocellulose; however, it may comprise any other suitable cellulose derivative and forms a major part of the coating composition, as is well known to the art to which this invention appertains. Any suitable plasticizer or mixture of plasticizers may be used whenever the composition is to be formed into films or coatings where increased flexibility is required. Where good heat-sealability is desired, the plasticizer should be so constituted that the composition seals readily at moderate temperatures, say of the order of 125° to 150° C. to make a tenacious, autogenous heat-seal of contiguous coated surfaces. Examples of preferred plasticizers are ethoxyethyl phthalate, methoxyethyl phthalate, triphenyl phosphate, and methyl, ethyl or butyl benzoyl benzoate.

Any suitable animal, mineral or vegetable wax may be used, but I prefer to use paraffin having a high melting point.

For the blown oil, I have found that either a blown or boiled oil (hereinafter referred to generally as "blown oil"), of animal or vegetable origin may be employed, such as, for example, blown or boiled rapeseed, neat's-foot, linseed, soya bean, or perilla, etc. The use of blown rapeseed oil is particularly desirable in that it produces an exceptionally odorless coating.

In the preferred modification of the invention, the blown oil is used in an amount just sufficient to avoid wax blush in the final coating or film. By use of the amounts of blown oil indicated, the required amount of wax can be used without the necessity of adding gums and/or resins to render the wax compatible with the lacquer base, although small amounts of such constituents may be added if desired, without departing from the spirit of the invention.

When the amount of blown oil is greater than about 5% of the weight of the coating composition exclusive of the solvent, the film or coating thus produced may be slightly oily and such oiliness increases with increase in the quantity of blown oil used. Further, the properties of my improved coating composition appear to be best suited for autogenous heat-sealing of contiguous surfaces coated therewith at temperatures in practical use, when the quantity of blown oil does not substantially exceed 5%. The quantities of oil used should be adjusted with respect to the texture of the coated material.

By way of more specific illustration of improved moistureproofing compositions embodying my novel ingredient, I mention the following examples in which all ingredients, except the solvents, are expressed by parts by weight:

|  | I | II | III | IV |
|---|---|---|---|---|
| Nitrocellulose (4 seconds) | 68.4 | 63.0 | 67.0 | 65.0 |
| Ethyl benzoyl benzoate | 27.0 |  | 20.0 |  |
| Dibutyl phthalate | 3.0 |  |  |  |
| Diethyl phthalate |  |  | 6.5 |  |
| Triphenyl phosphate |  | 30.0 |  | 30.0 |
| Blown rapeseed oil | 0.5 | 3.5 |  |  |
| Blown neat's-foot oil |  |  | 3.5 |  |
| Boiled linseed oil |  |  |  | 3.5 |
| Paraffin | 1.1 | 3.5 | 3.0 | 1.5 |

A lacquer may be prepared by taking up about 10 parts of one of the above compositions in about 150 parts of a suitable solvent such as, for example, one consisting of 15% ethyl acetate, 15% butyl acetate and 70% toluene. This solution may then be applied as a coating and dried in a heated dryer in the usual way, or formed into sheets or films, etc. if desired.

These novel compositions may be used in a number of arts, but are particularly advantageous for moistureproofing wrapping materials on account of the fact that they are transparent, non-greasy, non-tacky, substantially odorless and give a high degree of moistureproofness.

I have found that if a film or sheet of glycerinated regenerated cellulose having a thickness of about one-thousandth of an inch be coated, preferably on each side, with a moistureproofing composition of approximately 1.5 ten thousandths of an inch total thickness prepared in accordance with the present invention, the resistance of the coated sheet to the diffusion of water vapor is at least 50 times as great as that of the uncoated sheet of glycerinated regenerated cellulose when both are tested comparatively at ordinary temperatures up to 38° or 40° C. The term "moistureproof" as used herein is intended to cover a composition having such a moistureproofing value when so tested.

It will thus be seen that by means of the present invention there have been provided novel moistureproofing compositions having improved and technically important properties which may be economically and easily prepared and used, and since certain changes may be made in the above-mentioned products and different embodiments of the invention could be made without departing from the scope thereof, it is intended that all matter contained in the above description shall be interpreted as illustrative and not in a limited sense. It is also to be understood that in said claims ingredients recited in the singular are intended to include compatible mixtures of such ingredients wherever the sense permits.

Having described my invention, what I claim as new and desire to secure by Letters Patent is:

1. A composition for preparing moistureproof, transparent, non-oily, non-tacky coatings or films, comprising a compatible mixture of a cellulose derivative, up to about 5% of a wax and up to about 5% of blown oil.

2. A composition for preparing flexible, moistureproof, transparent, non-oily, non-tacky and readily heat-sealable coatings or films, comprising a compatible mixture of a cellulose derivative, up to about 5% of a wax, a plasticizer, and up to about 5% of non-resinous wax solvent consisting of blown oil.

3. A composition for preparing moistureproof, transparent, non-oily, and non-tacky coatings or films, comprising a compatible mixture of a cellulose derivative, up to about 5% of a wax, and up to about 5% of blown rapeseed oil.

4. A composition for preparing flexible, moistureproof, transparent, non-oily, non-tacky and readily heat-sealable coatings or films, comprising a compatible mixture of a cellulose derivative, up to about 5% of a wax, a plasticizer, and up to about 5% of non-resinous wax solvent consisting of blown rapeseed oil.

5. A composition for preparing flexible, moistureproof, transparent, non-oily, non-tacky and readily heat-sealable coatings or films, comprising a compatible mixture of a cellulose derivative in an amount of from about 50% to 75%, a plasticizer in an amount of from about 25% to 45%, a wax in an amount of from about 0.5% to 5%, and a non-resinous wax solvent consisting of blown oil in an amount of from about 0.5% to 5%.

6. A composition for preparing moistureproof, transparent, non-oily and non-tacky coatings or films, comprising a compatible mixture of a cellulose derivative, a wax and up to about 5% of a blown oil, said wax being present in said composition in an amount of from about 0.5% to 4.5% and said oil being present in an amount just sufficient to avoid wax blush in the final coating or film.

7. A composition for preparing flexible, moistureproof, transparent, non-oily, non-tacky and readily heat-sealable coatings or films, comprising a compatible mixture of a cellulose derivative, a wax, a plasticizer, and up to about 5% of non-resinous wax solvent consisting of blown rapeseed oil, said wax being present in said composition in an amount of from about 0.5% to 4.5% and said oil being present in an amount just sufficient to avoid wax blush in the final coating or film.

8. A composition for preparing moistureproof, transparent, non-oily and non-tacky coatings or films, comprising a compatible mixture of nitrocellulose, up to about 5% of a wax, and up to about 5% of blown rapeseed oil.

9. A composition for preparing flexible, moistureproof, transparent, non-oily, non-tacky and readily heat-sealable coatings or films, comprising a compatible mixture of nitrocellulose, up to about 5% of a wax, a plasticizer, and up to about 5% of non-resinous wax solvent consisting of blown rapeseed oil.

10. A composition for preparing flexible, moistureproof, transparent, non-oily, non-tacky and readily heat-sealable coatings or films, comprising a compatible mixture of nitrocellulose in an amount of from about 50% to 75%, a plasticizer in an amount of from about 25% to 45%, a wax in an amount of from 0.5% to 5%, and a non-resinous wax solvent consisting of blown oil in an amount of from about 0.5% to 5%.

11. A flexible, moistureproof, transparent, non-oily, non-tacky film, comprising a cellulose derivative, up to about 5% of a wax, and up to about 5% of a blown oil.

12. A flexible, moistureproof, transparent, non-oily, non-tacky film, comprising a cellulose nitrate, up to about 5% of a wax, and up to about 5% of a blown oil.

13. A flexible, moistureproof, transparent non-oily, non-tacky and readily heat-sealable film, comprising a cellulose derivative, a plasticizer, up to about 5% of a wax, and up to about 5% of non-resinous wax solvent consisting of blown rapeseed oil.

14. A flexible, moistureproof, transparent, non-oily, non-tacky and readily heat-sealable film, comprising a cellulose nitrate, up to about 5% of a wax, a plasticizer, and up to about 5% of non-resinous wax solvent consisting of blown rapeseed oil.

15. A flexible, moistureproof, transparent, non-oily, non-tacky and readily heat-sealable film comprising a cellulose derivative, a plasticizer, a wax and a non-resinous wax solvent consisting of blown oil, said wax being present in said composition in an amount of from about 0.5% to 5% and said oil being present in an amount just sufficient to avoid wax blush in the final coating or film.

16. A flexible, moistureproof, transparent, non-oily, non-tacky and readily heat-sealable film comprising a compatible mixture of nitrocellulose in an amount of from about 50% to 75%, a plasticizer in an amount of from about 25% to 45%, a wax in an amount of from about 0.5% to 5%, and a non-resinous wax solvent consisting of blown oil in an amount of from about 0.5% to 5%.

RALPH T. K. CORNWELL.